Feb. 7, 1961
S. L. CHRISTIE ET AL
2,971,147
REGULATED POWER SUPPLY
Filed Feb. 10, 1958
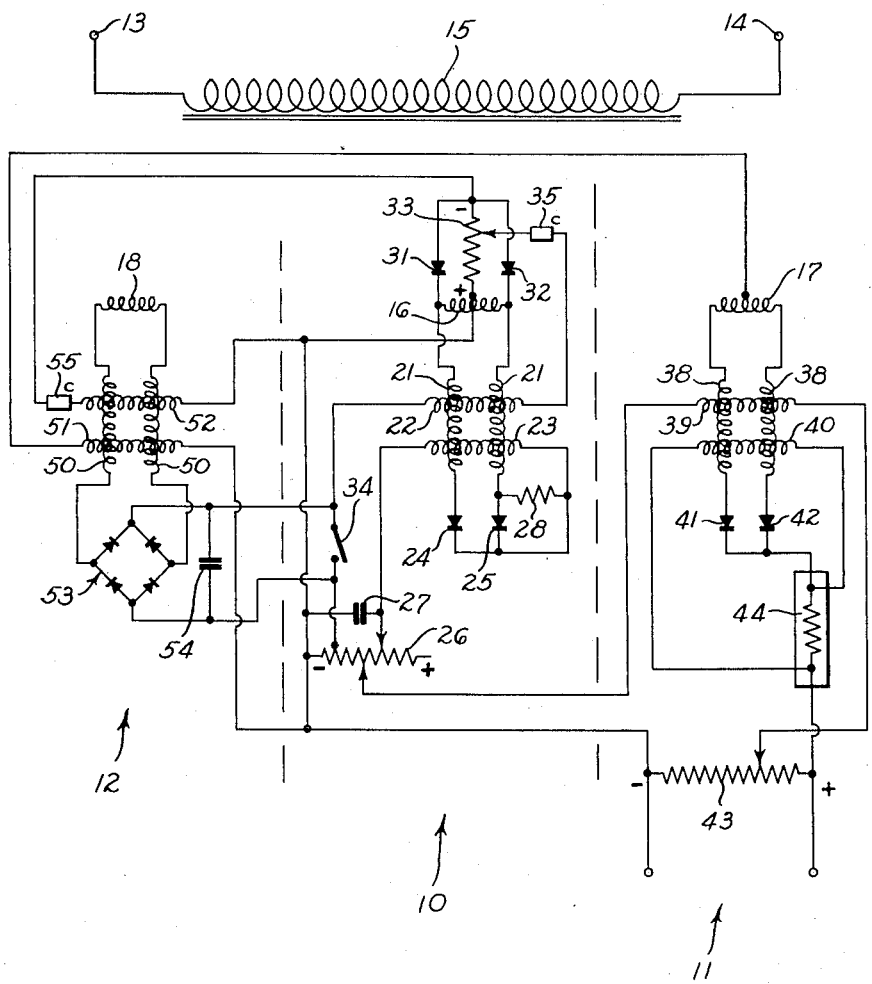
INVENTORS.
SOREN L. CHRISTIE
GLEN O. DUPUY
FRANK C. MARSHALL
BY THEIR ATTORNEYS.
HARRIS, KIECH, FOSTER & HARRIS United States Patent Office 2,971,147
Patented Feb. 7, 1961

2,971,147

REGULATED POWER SUPPLY

Soren L. Christie, Glen O. Du Puy, and Frank C. Marshall, Los Angeles, Calif., assignors to Christie Electric Corp., Los Angeles, Calif., a corporation of California Filed Feb. 10, 1958, Ser. No. 714,095

13 Claims. (Cl. 321—19)

This invention relates to a D.C. power supply for operation from an A.C. power source and, in particular, to a power supply suitable for use in battery charging, motor starting, electrolysis processes and the like.

It is an object of the invention to provide a power supply which will have a substantially constant output voltage while delivering a varying output current such as is required in charging batteries. A further object of the invention is to provide such a power supply in which the output is independent of variations in the A.C. source. Another object of the invention is to provide a power supply for automatically controlling the output current to a predetermined pattern and, in particular, automatically limiting the current to a predetermined maximum independent of the load impedance or counter E.M.F. applied.

It is a further object of the invention to provide a power supply in which the output voltage is automatically reduced to a lower value when the output current falls below a predetermined minimum. Such an apparatus is particularly adapted for automatic charging of storage batteries wherein it is desirable to reduce the charging voltage when the battery is fully charged to maintain a trickle or floating charge at the reduced voltage.

It is a further object of the invention to provide a constant voltage source suitable for use directly or as a reference for control of a second high power unit. Another object is to provide a control circuit for such a constant voltage source utilizing the substantially constant voltage characteristic of a zener element to provide the control for the voltage source.

It is a further object of the invention to provide an automatic voltage reduction system for a regulated voltage source consisting of an unbalanced rectifier in the voltage source which becomes effective at low current outputs. Another object is to provide such a system in which the unbalanced rectification is obtained by providing a relatively small amount of leakage current in one arm of the rectifier unit.

It is another object of the invention to provide a current limiting signal for the constant voltage source which current limiting signal is automatically coupled into the constant voltage source when the output current exceeds a particular maximum, the current limiting operation being ineffective when the output current is below this maximum. Another object of the invention is to provide such a current limiting circuit in which a full wave rectified current which is a function of the magnitude of the output current is connected in series with the D.C. control current of the constant voltage source such that current limiting occurs only when the peak value of the full wave rectified current exceeds the D.C. control current.

The invention also comprises novel details of construction and novel combinations and arrangements of parts, which will more fully appear in the course of the following description. The figure of the drawing shows a circuit diagram of a preferred embodiment of the present invention which is given by way of illustration or example. While the embodiment illustrated and described herein is used with a single phase, A.C. source, it should be understood that the invention is equally suitable for use with multiple-phase sources.

The apparatus of the invention as illustrated herein, includes a first regulated D.C. power supply 10, a second regulated D.C. power supply 11, and a D.C. current transductor 12. The A.C. power is supplied to the apparatus through terminals 13, 14 of primary winding 15 of a transformer having secondary windings 16, 17, 18.

The regulated D.C. power supply 10 may be used to provide the output of the apparatus of the invention directly or may be used to provide a reference voltage for controlling another unit which ordinarily would have considerably greater power handling capacity. The latter use is illustrated herein with the supply 10 providing a reference voltage for the supply 11.

The regulated D.C. power supply 10 includes an A.C. to D.C. converted for developing a D.C. voltage across an output load and having a control element for varying the magnitude of this output voltage. In the preferred embodiment of the invention illustrated herein, the converter includes a saturable reactor having a dual power winding 21, a control winding 22, and a current feedback winding 23, and a rectifier unit having rectifiers 24, 25, the reactor and the rectifier unit being connected to the secondary winding 16 in a single phase, center tapped circuit to provide a D.C. output across load resistor 26. A rectifier bridge circuit could be substituted for the center tapped circuit, and, of course, a multiple phase transformer windings, reactor windings and rectifiers could be substituted for the single phase circuitry illustrated herein. It is preferred to provide a current feedback circuit in the reactor as illustrated herein; however, if desired, the rectifiers 24, 25 can be directly connected to the resistor 26, omitting the current feedback winding 23. In the single phase circuit shown a filter capacitor 27 is coupled across the output and a resistor 28 is connected in parallel with rectifier 25 for purposes to be described subsequently.

A correction voltage which varies as a function of the A.C. input voltage is provided for use in controlling the output of the regulated D.C. power supply 10. A center tapped rectifying circuit including rectifiers 31, 32 and load resistor 33 connected across secondary winding 16 provides this correction voltage. A portion of the output voltage developed at resistor 26 and a portion of the correction voltage developed at resistor 33 are connected in adding relation to provide the current for the control winding 22 through switch 34, when closed, and a zener element 35. The magnitudes of the voltages so connected are dependent upon the parameters of the particular components being used and may be varied to provide the particular desired output. It is not only possible to compensate for the regulation imperfection of the zener element, but also to overcompensate in order to overcome the voltage drops in other parts of the circuit. This is an important feature of the invention.

A zener element is a semi-conductor device, such as a silicon crystal diode, operated in its breakdown region. In its breakdown region, the voltage of a zener element is nearly independent of the current, or, stated differently, there is a large current change for a small voltage change. A zener element may be defined as a nonlinear circuit element, having a sharp kneed current-voltage characteristic curve, which is being operated on the steep portion of the curve. The circuit described, in addition to providing excellent voltage regulation, also provides protection to the zener element against damage from voltage surges caused by switching and the like. This is another important feature of the invention.

The regulated D.C. power supply 11 may be similar to the power supply 10 and, as illustrated herein, includes a saturable reactor having power winding 38, control winding 39 and current feedback winding 40, and a rectifier unit having rectifiers 41, 42 connected with the secondary winding 17 as a center tapped rectifying system providing a D.C. output across load resistor 43. The output current of the supply 11 may be connected through the D.C. current transductor 12 for purposes to be described subsequently.

A portion of the output voltage developed across the resistor 43 is compared with a portion of the output voltage developed across the resistor 26 producing a differential control voltage for energizing the control winding 39. Since the voltage at resistor 26 is constant, any variation in the output voltage at resistor 43 will provide a voltage error current for the control winding 39 resulting in correction and maintenance of a substantially constant output voltage at resistor 43.

The current feedback winding 40 provides additional compensation for voltage drop caused by the load current of the power supply. A current for the feedback winding 40 proportional to the output current of the supply is obtained by connecting the winding 40 across a low resistance, high current resistor 44 connected in series in the output line. Such current feedback may be omitted if desired. Also, the feedback winding 40 may be omitted and the feedback winding 23 of the supply 10 may be connected across the resistor 44, thereby improving the current feedback correction.

The circuit of the regulated power supply 10 described above can be used to provide an automatic reduction of output voltage when the output current drops below a predetermined value. This feature is especially suitable for use in charging batteries wherein it is desired to maintain a trickle or floating charge at a voltage below the normal charging voltage when the battery is fully charged. A slight current unbalance between the arms of the rectifier circuit provides this automatic voltage switching. Under normal operating conditions at high current output, this current unbalance is negligible. However, when the output current has fallen to a relatively small value, indicative of full charge on the battery, the unbalance will cause one of the arms of the rectifier to take over, changing from full wave operation to half wave operation in a single phase circuit and from multiple phase to single phase operation in a multiple phase circuit. This change in rectifying operation reduces the output voltage and current of the supply.

The desired unbalance in the rectifier unit is preferably accomplished by unbalanced leakage currents in the blocking direction of the rectifiers with this leakage current passing through the power winding of the reactor. Unbalanced leakage currents can be obtained by using rectifiers having different characteristics or by using identical rectifiers and providing a bridging impedance, such as the resistor 28, across one of the rectifiers. The parameters of the rectifier circuit are chosen so that the magnitude of the unbalanced leakage current is quite small relative to the full load output of the circuit.

Thus, when the unit is operating at high current outputs, the unbalance in the rectifier unit will have no effect upon the output voltage. However, when the output current drops below a predetermined low value, the output voltage will automatically be reduced. Then when a high current is again required, as when a load is applied to the battery or the battery charging requirements are increased for other reasons, the output voltage will automatically be changed to the higher regulated value. In the case where a second power supply 11 is used, the unbalance can be provided between the rectifiers 41, 42.

The D.C. current transductor 12 provides a control for the maximum output current of the unit, the transductor output being coupled in circuit with the power supply 10 when the switch 34 is open. It is oftentimes desirable in a power supply to automatically control the output current to a predetermined pattern and, in particular, to limit the current so that it cannot exceed a preselected value even when the minimum load impedance or minimum counter E.M.F. is applied. Of particular interest is a characteristic of constant voltage for load currents up to a preselected value and then a sharp or nearly vertical drop off of voltage to maintain regulated constant current as the load impedance or counter E.M.F. is reduced. Such characteristic is useful for overload protection and for various applications such as motor starting, electrolysis processes, and battery charging.

The transductor produces an output which is a function of the D.C. current output of the system and, in the embodiment illustrated herein, includes a saturable reactor having a power winding 50, a control winding 51, and a bias winding 52, with the power winding coupled between the secondary winding 18 and the input of a full wave bridge rectifier 53. The output of the rectifier is connected to the terminals of the switch 34, and a capacitor 54 is coupled across this output. A current proportional to the output current of the entire system is connected to the control winding 51. The control winding 51 may carry the full output current as shown in the drawing, or may carry a shunted part thereof, or, in the event the supply 11 is not used, may carry the output current of the supply 10.

When the switch 34 is open, the output current of the transductor 12 is connected in series with the control current in the control winding 22 of the supply 10. The control current due to the control and correction voltages of the supply 10 serves as a bias current in the rectifier 53, preventing rectification of the transductor output until the peak value of the A.C. transductor output exceeds this D.C. current. Then the blocking action of the transductor rectifiers takes effect by blocking any subtractive wave peaks of the transductor output which would reverse the polarity of the control current through the rectifiers. The subtractive half waves are thus partly chopped off but the additive half waves are not, producing a resultant D.C. current which is additive to the control current. This increase in current through the control winding 22 produces a sharp drop off in the output voltage of the supply thus providing the desired reduction in output voltage when the output current exceeds a predetermined value. The current value at which the transductor action takes effect is controlled by the relative magnitudes of the outputs of the transductor and the control current in the power supply 10. The sharpness of the voltage drop when this maximum current is exceeded may be controlled by varying the amount of current feedback in the saturable reactors and by the value of the capacitor 54.

The D.C. control current for the winding 22 in the supply 10 increases somewhat with the voltage of the A.C. source. In order to have the voltage dropping action of the transductor 12 effective at the same output current regardless of the magnitude of the A.C. source, a compensation circuit consisting of the bias winding 52 in series with a zener element 55 is coupled across all or part of the resistor 33 which provides a D.C. voltage as a function of changes in the A.C. source. The bias winding 52 is connected to magnetically aid the control winding 51. The zener element 55 may be similar to the zener element 35 and, as the zener element is highly sensitive to voltage changes, the current in the bias winding 52 will vary accordingly with variations in the A.C. source. For a given D.C. current in the control winding 51, which current corresponds to the output current of the entire unit, the transductor output current will vary with the voltage of the A.C. source, thus compensating for the error in the high current-voltage drop point previously referred to.

When connected to a discharged battery, the low counter E.M.F. of the battery will cause the output current to be at the maximum value permitted by the current limiting control action of the transductor. This current value will be maintained substantially constant until the battery voltage has risen to the preset value. Then the voltage will be maintained substantially constant at this value while the current to the battery will continue to drop. When the battery is fully charged and the output current falls below the predetermined low magnitude, the output voltage will be automatically reduced to the trickle or floating charge condition. If load is drained from the battery, the charger furnishes a heavy current while the battery terminal voltage is low. The current limiting control limits the current to the capacity of the charger, thus preventing damage. Upon removal of the load, recharging will resume, continue until full charge has been reached, and then automatically switch to trickle charging to replenish the battery self-discharge over extended periods.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a D.C. power supply for use with a battery charger or the like, the combination of: an A.C. power source; saturable reactor means having a power winding and a control winding; a rectifier unit; a first output load; first circuit means interconnecting said power source, said power winding and said rectifier unit to provide a first D.C. output voltage across said first load; means for developing a D.C. correction voltage which varies as a function of the A.C. power source; a first control circuit connected to said control winding, said first control circuit including a zener element in series with said control winding and at least portions of said correction voltage and said first output voltage with said voltages adding to provide a control current; an A.C. to D.C. converter having a control element for varying the output thereof; a second output load; second circuit means interconnecting said power source and said converter to provide a second D.C. output voltage across said second load; and a second control circuit for connecting at least portions of said first and second output voltages to said control element with said output voltages in cancelling relationship to provide a differential control voltage.

2. In a D.C. power supply for use with a battery charger or the like, the combination of: an A.C. power source; saturable reactor means having a power winding and a control winding; a first rectifier unit; an output load; circuit means interconnecting said power source, said power winding and said first rectifier unit to provide a D.C. output voltage across said load; means for developing a D.C. correction voltage which varies as a function of the A.C. power source; a control circuit connected to said control winding, said control circuit including a zener element in series with said control winding and at least portions of said correction voltage and said output voltage with said voltages adding to provide a control current; a transductor for providing an A.C. current which varies as a function of the output current of the D.C. power supply; and a second rectifier unit connected into said control circuit with said A.C. current coupled thereto as an input to produce a D.C. current for addition to said control current when said A.C. current exceeds a limit which is a function of said control current.

3. In a D.C. power supply for use with a battery charger or the like, the combination of: an A.C. power source; first saturable reactor means having a first power winding and a first control winding; a rectifier unit; a first output load; first circuit means interconnecting said power source, said first power winding and said rectifier unit to provide a first D.C. output voltage across said first load; means for developing a D.C. correction voltage which varies as a function of the A.C. power source; a first control circuit connected to said first control winding, said first control circuit including a zener element in series with said first control winding and at least portions of said correction voltage and said first output voltage with said voltages adding to provide a control current; an A.C. to D.C. converter having a control element for varying the output thereof; a second output load; second circuit means interconnecting said power source and said converter to provide a second D.C. output voltage across said second load; a second control circuit for connecting at least portions of said first and second output voltages to said control element with said output voltages in cancelling relationship to provide a differential control voltage; second saturable reactor means having a second power winding and a second control winding; a full wave rectifier; third circuit means for interconnecting said power source and said second power winding to provide an input to said full wave rectifier with the output thereof in series with said control current of said first control circuit; and fourth circuit means for connecting the output current of said converter to said second control winding.

4. In a D.C. power supply for use with a battery charger or the like, the combination of: an A.C. power source; saturable reactor means having a power winding and first and second control windings; a first rectifier unit; an output load; circuit means interconnecting said power source, said power winding and said first rectifier unit to provide a D.C. output voltage across said load with the D.C. output current passing through said second control winding in feedback relation; means for developing a D.C. correction voltage which varies as a function of the A.C. power source; a control circuit connected to said first control winding, said control circuit including a zener element in series with said first control winding and at least portions of said correction voltage and said output voltage with said voltages adding to provide a control current; a transductor for producing an A.C. current which varies as a function of the output current of the D.C. supply; and a second rectifier unit connected into said control circuit with said A.C. current coupled thereto as an input to produce a D.C. current for addition to said control current when said A.C. current exceeds a limit which is a function of said control current.

5. In a D.C. power supply for use with a battery charger or the like, the combination of: an A.C. power source; first saturable reactor means having a first power winding and first and third control windings; a rectifier unit; a first output load; first circuit means interconnecting said power source, said first power winding and said rectifier unit to provide a first D.C. output voltage across said first load; means for developing a D.C. correction voltage which varies as a function of the A.C. power source; a first control circuit connected to said first control winding, said first control circuit including a zener element in series with said first control winding and at least portions of said correction voltage and said first output voltage with said voltages adding to provide a control current; an A.C. to D.C. converter having a control element for varying the output thereof; a second output load; second circuit means interconnecting said power source and said converter to provide a second D.C. output voltage across said second load; a second control circuit for connecting at least portions of said first and second output voltages to said control element with said output voltages in cancelling relationship to provide a differential control voltage; second saturable reactor means having a second power winding and a second control winding; a full wave rectifier; third circuit means for interconnecting said power source and said second power winding to provide an input to said full wave rectifier with the output thereof in series with said control current of said first control circuit; fourth circuit means for connecting the output current of said converter to said second control winding; and means for connecting a current proportional to the output current of said converter to said third control winding in feedback relation.

6. In a D.C. power supply for use with a battery charger or the like, the combination of: an A.C. power source; first saturable reactor means having a first power winding and a first control winding; a rectifier unit; an output load; first circuit means interconnecting said power source, said first power winding and said rectifier unit to provide an output voltage across said load; means for developing a D.C. correction voltage which varies as a function of the A.C. power source; a first control circuit connected to said first control winding, said first control circuit including a first zener element in series with said first control winding and at least portions of said correction voltage and said output voltage with said voltages adding to provide a first control current; second saturable reactor means having a second power winding and second and third control windings; a full wave rectifier; second circuit means interconnecting said power source and said second power winding to provide an input to said full wave rectifier with the output thereof in series with said first control current; third circuit means for connecting the output current of said D.C. power supply to said second control winding; and a second control circuit connected to said third control winding, said second control circuit including a second zener element in series with said third control winding and at least a portion of said correction voltage to provide a second control current.

7. In a D.C. power supply for use with a battery charger or the like, the combination of: an A.C. power source; first saturable reactor means having a first power winding and a first control winding; a rectifier unit; a first output load; first circuit means interconnecting said power source, said first power winding and said rectifier unit to provide a first D.C. output voltage across said first load; means for developing a D.C. correction voltage which varies as a function of the A.C. power source; a first control circuit connected to said first control winding, said first control circuit including a zener element in series with said first control winding and at least portions of said correction voltage and said first output voltage with said voltage adding to provide a control current; an A.C. to D.C. converter having a control element for varying the output thereof; a second output load; a second circuit means interconnecting said power source and said converter to provide a second D.C. output voltage across said second load; a second control circuit for connecting at least portions of said first and second output voltages to said control element with said output voltages in cancelling relationship to provide a differential control voltage; second saturable reactor means having a second power winding and second and third control windings; a full wave rectifier; third circuit means for interconnecting said power source and said second power winding to provide an input to said full wave rectifier with the output thereof in series with said control current of said first control circuit; fourth circuit means for connecting the output current of said converter to said second control winding; and a third control circuit connected to said third control winding, said third control circuit including a secon zener element in series with said third control winding and at least a portion of said correction voltage to provide a second control current.

8. In a D.C. power supply for use with a battery charger or the like, the combination of: an A.C. power source; saturable reactor means having a power winding and a control winding; a first rectifier unit; a first output load; first circuit means interconnecting said power source, said power winding and said first rectifier unit to provide a first D.C. output voltage across said first load; means for developing a D.C. correction voltage which varies as a function of the A.C. power source; a first control circuit connected to said control winding, said first control circuit including a zener element in series with said control winding and at least portions of said correction voltage and said first output voltage with said voltages adding to provide a control current; a second multiarm rectifier unit with unequal leakage currents in the arms thereof and having a control element for varying the output thereof; a second output load; second circuit means interconnecting said power source and said second rectifier unit to provide a second D.C. output voltage across said second load; and a second control circuit for connecting at least portions of said first and second output voltages to said control element with said output voltages in cancelling relationship to provide a differential control voltage, the current unbalance of said second rectifier unit at low output current conditions substantially reducing said second output voltage.

9. In a D.C. power supply for use with a battery charger or the like, the combination of: an A.C. to D.C. multiarm rectifier unit having a control element for varying the output thereof and having a current unbalance between the arms of the rectifier unit, said unbalance being small relative to the full load current of the unit; a source of a reference voltage; and means for coupling said reference voltage to said control element for controlling the output voltage of said rectifier unit, said means including a non-linear circuit element having a sharp kneed current-voltage characteristic curve and operating on a steep portion of the curve, with the current unbalance of said rectifier unit at low current operating conditions reducing the output voltage of the unit below that called for by said reference voltage.

10. In a reference voltage source for controlling a D.C. power supply, the combination of: an A.C. power source; saturable reactor means with a power winding and a control winding; a multiarm rectifier unit with unequal leakage currents in the arms thereof; an output load; first circuit means interconnecting said power source, said power winding and said rectifier unit to provide a D.C. output voltage across said load, with the current unbalance of said rectifier unit at low output current conditions substantially reducing said output voltage; a control circuit connected to said control winding for controlling said output voltage, said control circuit including a voltage source and a non-linear circuit element having a sharp kneed current-voltage characteristic curve and operating on a steep portion of the curve; and second circuit means for coupling at least portions of said output voltage and the output voltage of the D.C. power supply in subtractive relation to provide the reference voltage source.

11. In a D.C. power supply for use with a battery charger or the like, the combination of: first converter means for converting an A.C. input to a D.C. output; first control means responsive to a control current for controlling the output of said first converter means; second converter means for converting an A.C. input to a D.C. output, said second converter means having at least two output elements providing unequal outputs, the magnitude of inequality being substantially independent of the magnitude of the output thereof; second control means responsive to a control current for controlling the output of said second converter means; means for combining said D.C. outputs in cancelling relation to provide the control current for said first control means; correction means for producing a D.C. correction voltage which varies as a function of the A.C. input; means for combining said correction voltage and the output of said second converter means to provide the control current for said second control means, said means for combining including a zener element in circuit with said second control means; transductor means for providing a reference current which varies as a function of the output current of said first converter means; and comparison means for comparing said reference current with the control current of said second converter means for coupling at least a portion of said reference current in circuit with said second control means to reduce the output of said second converter means when said reference current exceeds a limit which is a function of the control current of said second converter means.

12. In a D.C. power supply for use with a battery charger or the like, the combination of: an A.C. power source; saturable reactor means having a power winding and a control winding; a rectifier unit; an output load; circuit means interconnecting said power source, said power winding and said rectifier unit to provide a D.C. output voltage across said load; means for developing a D.C. correction voltage which varies as a function of the A.C. power source; and a control circuit comprising a serial connection of a zener element, at least a portion of said correction voltage, at least a portion of said output voltage, and said control winding, with said zener element operating in its zener region and with said voltages adding to provide a continuous control current in said control winding.

13. In a D.C. power supply for use with a battery charger or the like, the combination of: an A.C. power source; saturable reactor means having a power winding and a control winding; a multiarm rectifier unit with a current unbalance between the arms thereof, said unbalance being small relative to the full load current of the unit; an output load; circuit means interconnecting said power source, said power winding and said rectifier unit to provide a D.C. output voltage across said load, with the current unbalance of said rectifier unit at low output current conditions substantially reducing said output voltage; means for developing a D.C. correction voltage which varies as a function of the A.C. power source; and a control circuit comprising a serial connection of a zener element, at least a portion of said correction voltage, at least a portion of said output voltage, and said control winding, with said zener element operating in its zener region and with said voltages adding to produce a continuous control current in said control winding.

References Cited in the file of this patent

UNITED STATES PATENTS

| | | |
|---|---|---|
| 2,114,827 | Aggers | Apr. 19, 1938 |
| 2,365,611 | White | Dec. 19, 1944 |
| 2,774,930 | Bixby | Dec. 18, 1956 |
| 2,810,877 | Silver | Oct. 22, 1957 |
| 2,816,260 | Scorgie | Dec. 10, 1957 |

UNITED STATES PATENT OFFICE
CERTIFICATION OF CORRECTION

Patent No. 2,971,147　　　　　　　　　　　　　　　　February 7, 1961

Soren L. Christie et al.

It is hereby certified that error appears in the above numbered patent requiring correction and that the said Letters Patent should read as corrected below.

Column 7, line 42, for "voltage" read -- voltages --.

Signed and sealed this 27th day of June 1961.

(SEAL)
Attest:

ERNEST W. SWIDER  
Attesting Officer

DAVID L. LADD  
Commissioner of Patents